US012651875B2

(12) United States Patent
Li et al.

(10) Patent No.: US 12,651,875 B2
(45) Date of Patent: Jun. 9, 2026

(54) CONNECTOR ASSEMBLY AND ELECTRICAL CONNECTION ASSEMBLY

(71) Applicant: Tyco Electronics (Shanghai) Co., Ltd., Shanghai (CN)

(72) Inventors: Xuexiu Li, Shanghai (CN); Xiao (Nichee) Zhou, Shanghai (CN)

(73) Assignee: Tyco Electronics (Shanghai ) Co., Ltd., Shanghai (CN)

( * ) Notice: Subject to any disclaimer, the term of this patent is extended or adjusted under 35 U.S.C. 154(b) by 324 days.

(21) Appl. No.: 18/474,792

(22) Filed: Sep. 26, 2023

(65) Prior Publication Data

US 2024/0106175 A1 Mar. 28, 2024

(30) Foreign Application Priority Data

Sep. 26, 2022 (CN) ......................... 202222557319.7

(51) Int. Cl.

| | |
|---|---|
| ***H01R 13/74*** | (2006.01) |
| ***H01R 13/631*** | (2006.01) |
| ***H01R 13/6596*** | (2011.01) |
| ***H01R 27/02*** | (2006.01) |

(52) U.S. Cl.

CPC ......... *H01R 13/74* (2013.01); *H01R 13/6315* (2013.01); *H01R 13/6596* (2013.01); *H01R 27/02* (2013.01); *H01R 2201/26* (2013.01)

(58) Field of Classification Search

CPC ........................... H01R 13/74; H01R 13/6315; H01R 13/6596; H01R 27/02; H01R 2201/26; H01R 13/6585; H01R 11/26; H01R 13/187; H01R 11/281; H01R 13/24; H01R 13/621; H01R 13/64; H01R 13/6471; H01R 13/6581; H01M 50/50; B60L 53/16

See application file for complete search history.

(56) References Cited

U.S. PATENT DOCUMENTS

| | | | | |
|---|---|---|---|---|
| 5,752,845 | A * | 5/1998 | Fu | B60N 2/5891 439/247 |
| 5,857,863 | A * | 1/1999 | Onizuka | B60R 16/0207 439/364 |
| 6,210,216 | B1 * | 4/2001 | Tso-Chin | H01R 13/748 439/701 |
| 6,722,924 | B1 * | 4/2004 | Zhou | H01R 13/659 439/607.23 |
| 7,946,887 | B1 * | 5/2011 | Zhang | H01R 27/02 439/607.23 |
| 8,672,696 | B2 * | 3/2014 | Sakurai | H01R 13/6315 439/247 |
| 9,270,058 | B2 * | 2/2016 | Wu | H01R 13/6591 |
| 12,327,967 | B2 * | 6/2025 | Bunke | H01R 13/6581 |

(Continued)

FOREIGN PATENT DOCUMENTS

CN 113745905 A * 12/2021 ........... H01R 13/748

*Primary Examiner* — Travis S Chambers

(74) *Attorney, Agent, or Firm* — Barley Snyder

(57) ABSTRACT

A connector assembly includes an installation seat having a pair of first installation holes and a second installation hole, a pair of first connectors respectively detachably inserted into the first installation holes, and a second connector detachably inserted into the second installation hole. Each of the first connectors has a power terminal. The second connector has a signal terminal and a grounding terminal.

21 Claims, 12 Drawing Sheets

(56) References Cited

U.S. PATENT DOCUMENTS

| | | | | |
|---|---|---|---|---|
| 2002/0048982 | A1* | 4/2002 | Gu | H01R 13/6315<br>439/247 |
| 2010/0062653 | A1* | 3/2010 | Mao | H01R 12/712<br>439/660 |
| 2012/0329316 | A1* | 12/2012 | Wu | H01R 13/6315<br>439/518 |
| 2025/0007204 | A1* | 1/2025 | Zhang | H01R 13/6315 |

* cited by examiner

CONNECTOR ASSEMBLY AND ELECTRICAL CONNECTION ASSEMBLY

CROSS-REFERENCE TO RELATED APPLICATION

This application claims the benefit of the filing date under 35 U.S.C. § 119(a)-(d) of Chinese Patent Application No. 202222557319.7, filed on Sep. 26, 2022.

FIELD OF THE INVENTION

The present invention relates to a connector assembly for electrically connecting a new energy vehicle battery pack and an electrical connection assembly including the connector assembly.

BACKGROUND

In the prior art, in electric vehicles, in order to achieve fast electrical connection with battery packs, multiple connectors are usually required. For example, multiple different signal connectors need to be provided. This leads to a complex structure, large volume and weight, and very inconvenient use of the entire electrical connection device. In addition, in the prior art, both the signal connector and the power connector used for power transmission are integrated into the same insulator and cannot be disassembled. Therefore, when a connector encounters a problem, the entire connection assembly must be replaced, which is costly.

SUMMARY

A connector assembly includes an installation seat having a pair of first installation holes and a second installation hole, a pair of first connectors respectively detachably inserted into the first installation holes, and a second connector detachably inserted into the second installation hole. Each of the first connectors has a power terminal. The second connector has a signal terminal and a grounding terminal.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
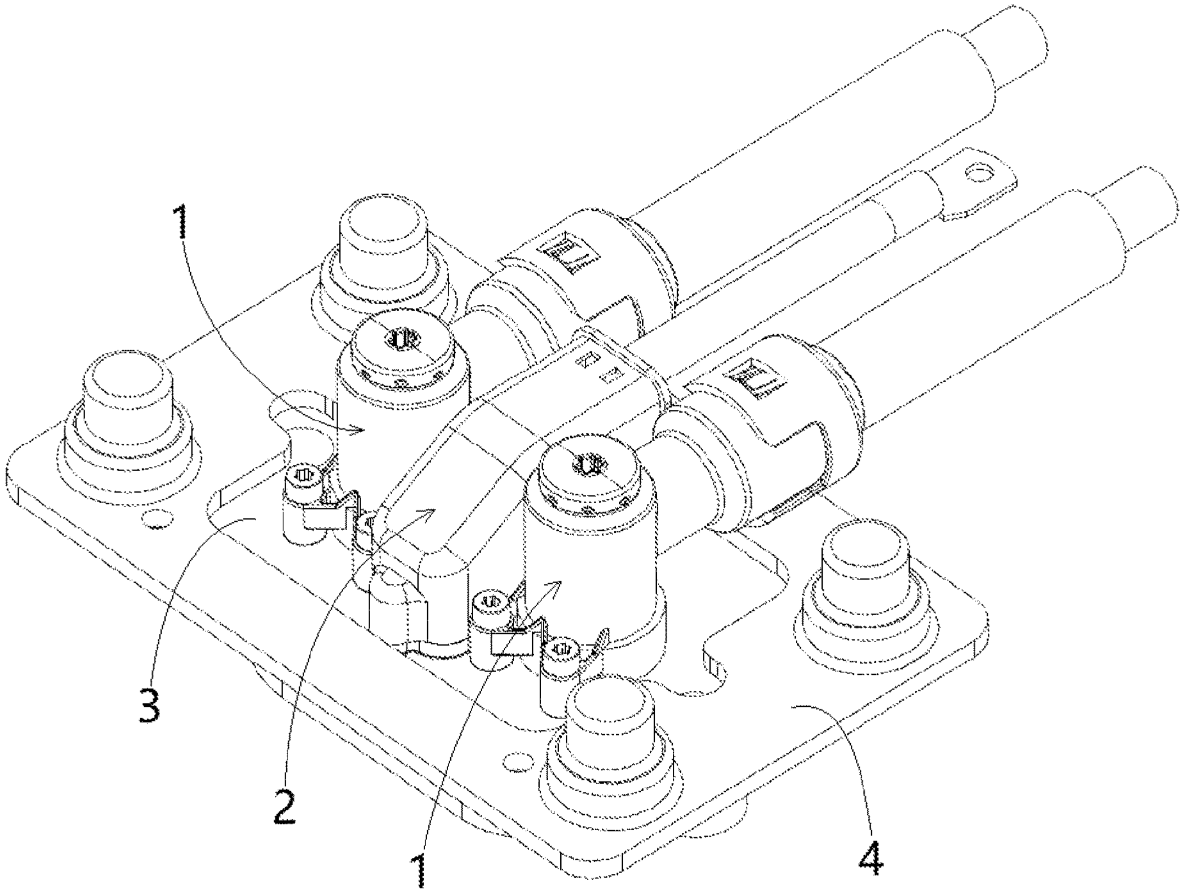
FIG. 1 shows an illustrative perspective view of a connector assembly according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIGS. 1 to 5, in an exemplary embodiment of the present invention, a connector assembly is disclosed. The connector assembly includes: an installation seat 3, two first connectors 1, and a second connector 2. The installation seat 3 is formed with two first installation holes 31 and one second installation hole 32. The two first connectors 1 can be respectively detachably inserted into the two first installation holes 31, and each includes a power terminal 16 for power transmission. The second connector 2 can be detachably inserted into the second installation hole 32 and includes a signal terminal 25 for transmitting signals and a grounding terminal 26 for grounding. In the illustrated embodiment, the first connector 1 has a higher operating voltage and is referred as a high-voltage connector, and the second connector 2 has a lower operating voltage and is referred as a low-voltage connector.

As shown in FIGS. 1 to 5, in the illustrated embodiment, the first connector 1 includes: a first insulator 11, a first shielding shell 12, and a first power cable 14. The first shielding shell 12 has a first installation port and a first cable port. A portion of the first insulator 11 (upper part in the figure) is inserted into the first shielding shell 12 through the first installation port, and the power terminal 16 is set in the first insulator 11. One end of the first power cable 14 extends into the first shielding shell 12 through the first cable port and is electrically connected to the power terminal 16.

Figure 2:
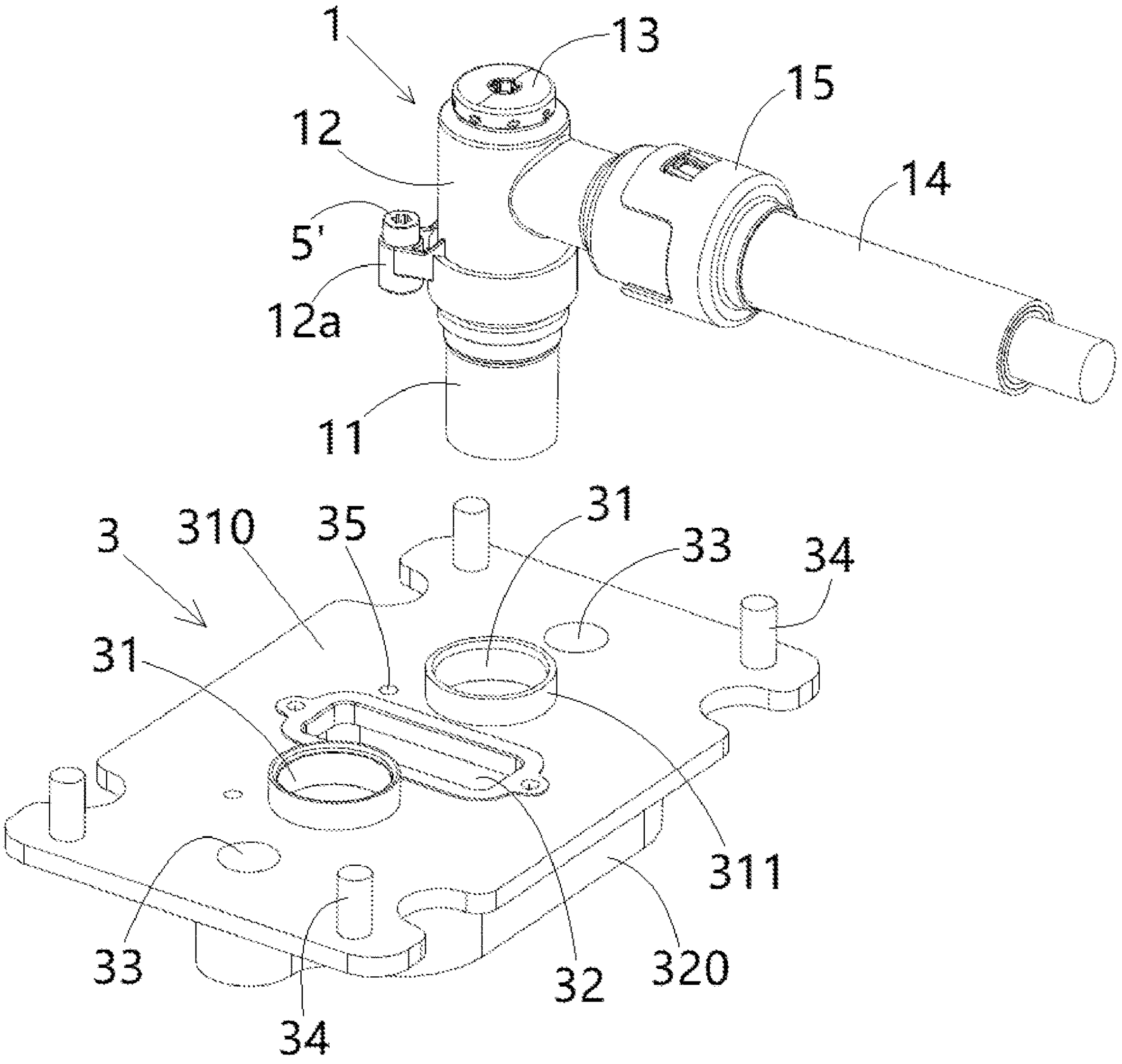
FIG. 2 shows an illustrative perspective view of an installation seat and a first connector of a connector assembly according to an exemplary embodiment of the present invention.

In the illustrated embodiment, the installation seat 3 includes an installation plate 310 and a positioning part 311, as shown in FIG. 2. The positioning part 311 is protruded and formed on the top surface of the installation plate 310. The positioning part 311 is assembled into the first installation port of the first shielding shell 12, and the first installation hole 31 penetrates through the positioning part 311 and the installation plate 310. The other part of the first insulator 11 (lower part in the figure) passes through the first installation hole 31 and protrudes from the bottom surface of the installation plate 310 to be inserted into a first mating shielding shell 12' of the first mating connector 1'.

Figure 3:
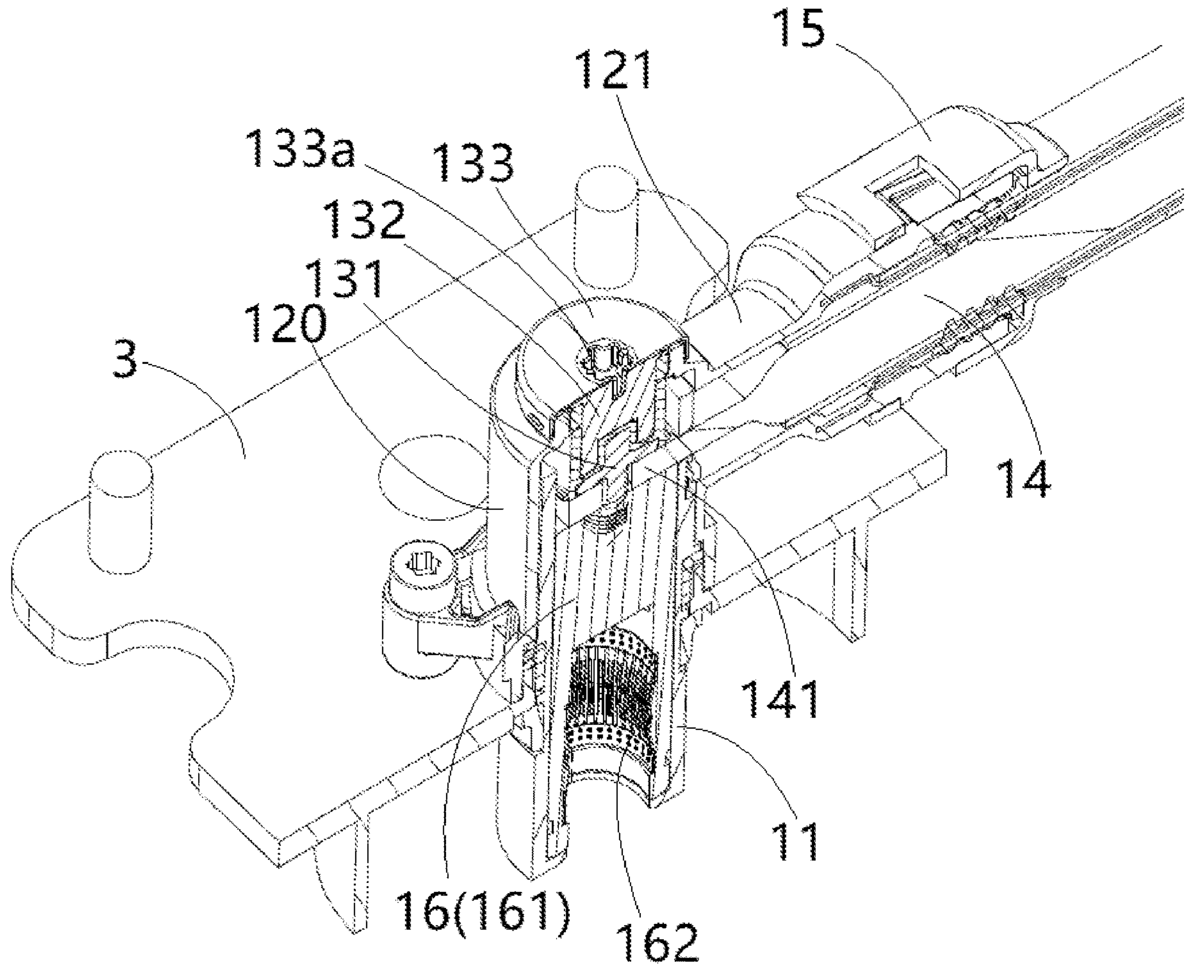
FIG. 3 shows an axial cross-sectional view of an installation seat and a first connector of a connector assembly according to an exemplary embodiment of the present invention.

As shown in FIG. 3, in the illustrated embodiments, the power terminal 16 includes a first terminal body 161 and a first elastic contact member 162. One end of the first terminal body 161 is electrically connected to the first power cable 14, and the other end is formed with a first cavity. The first elastic contact member 162 is installed in the first cavity of the first terminal body 161 for electrical contact with an inserted first mating power terminal 16' of the first mating connectors 1'. In the illustrated embodiment, the first elastic contact member 162 includes multiple elastic arms distributed at circumferential intervals. The first mating power terminal 16' is cylindrical and adapted to be inserted between multiple elastic arms of the first elastic contact member 162.

In the illustrated embodiment, the first power cable 14 has an exposed flat conductor end 141 in which a connection hole is formed, as shown in FIG. 3. The first shielding shell 12 has a second installation port (upper port in the figure) opposite to the first installation port (lower port in the figure), and the first connector 1 also includes a fastening assembly 13 installed in the second installation port. In the illustrated embodiment, the fastening assembly 13 includes: a connecting bolt 131, a shielding end cap 133, and an insulation nut 132. The connecting bolt 131 passes through the connecting hole in the flat conductor end 141 and is threaded to the first terminal body 161. The shielding end cap 133 is installed on the second installation port of the first shielding shell 12 to cover the second installation port. This way, it can prevent dust and electromagnetic leakage. The insulation nut 132 is engaged between the connecting bolt 131 and the shielding end cap 133 to electrically isolate the connecting bolt 131 from the shielding end cap 133. An engagement part 133*a* suitable for engaging with an operating tool is formed on the shielding end cap 133, so as to drive the connecting bolt 131 to rotate by the operating tool.

As shown in FIG. 2, in the illustrated embodiment, the first connector 1 further includes a first end cap 15, which is sheathed on the first power cable 14 and locked onto the outer wall of the first cable port of the first shielding shell 12.

As shown in FIG. 2, in the illustrated embodiments, a connecting ear 12*a* is formed on the first shielding shell 12, a first connection hole is formed in the connecting ear 12*a*, and a first threaded hole 35 is formed on the installation seat 3. The first connector 1 also includes a first screw 5', which passes through the first connection hole and is threaded into the first threaded hole 35 to secure the first shielding shell 12 to the installation seat 3.

Figure 4:
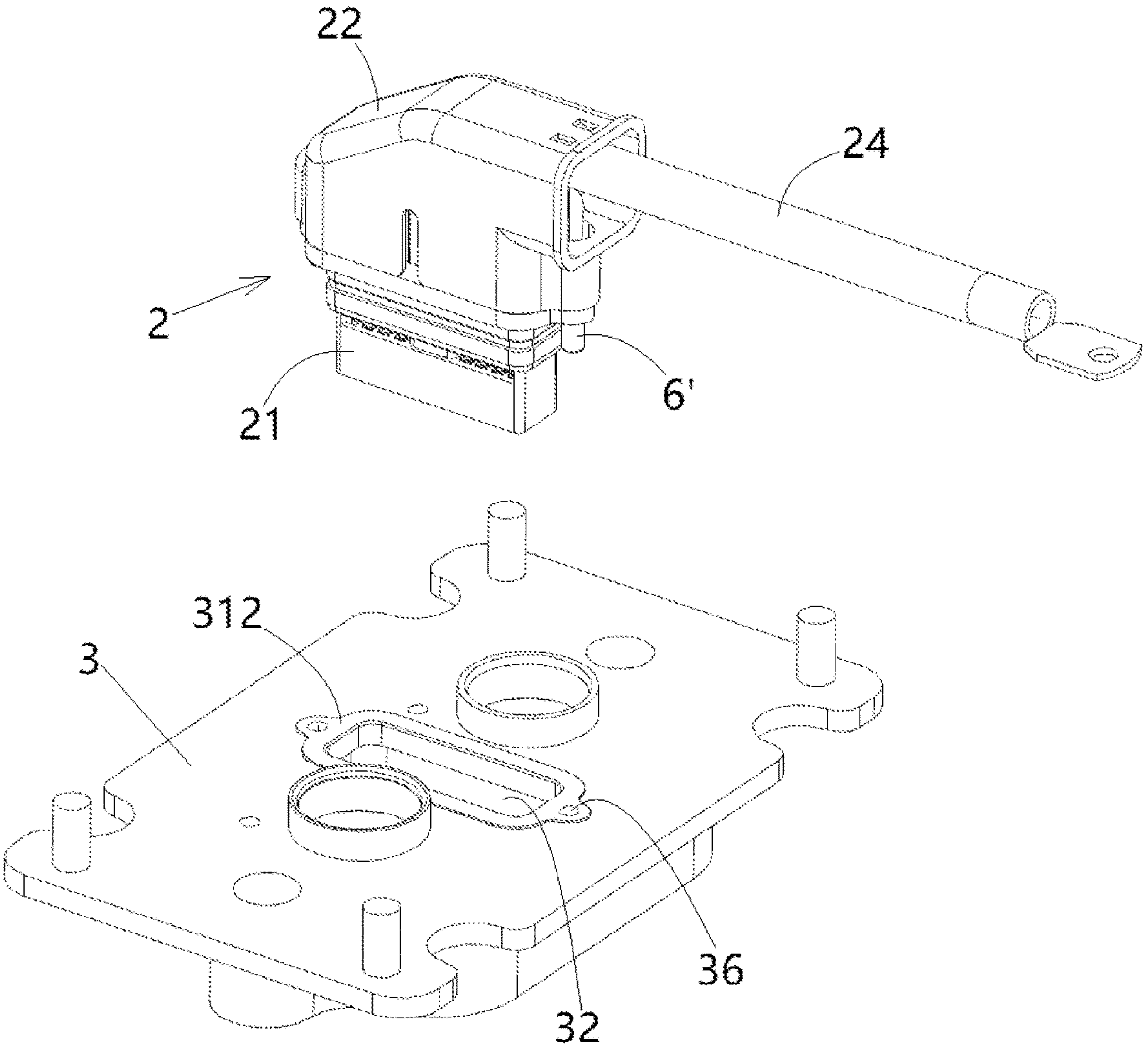
FIG. 4 shows an illustrative perspective view of an installation seat and a second connector of a connector assembly according to an exemplary embodiment of the present invention.

In the illustrated embodiment, the second connector 2 further includes a second insulator 21, a second shielding shell 22, a signal cable 23, and a grounding cable 24, as shown in FIG. 4. The second shielding shell 22 has an installation port and a cable port. A portion of the second insulator 21 is inserted into the second shielding shell 22 through an installation port, and the signal terminal 25 and ground terminal 26 are provided in the second insulator 21. One end of the signal cable 23 extends into the second shielding shell 22 through the cable port of the second shielding shell 22 and is electrically connected to the signal terminal 25. One end of the grounding cable 24 extends into the second shielding shell 22 through the cable port of the second shielding shell 22 and is electrically connected to the grounding terminal 26, as shown in FIG. 5.

Figure 7:
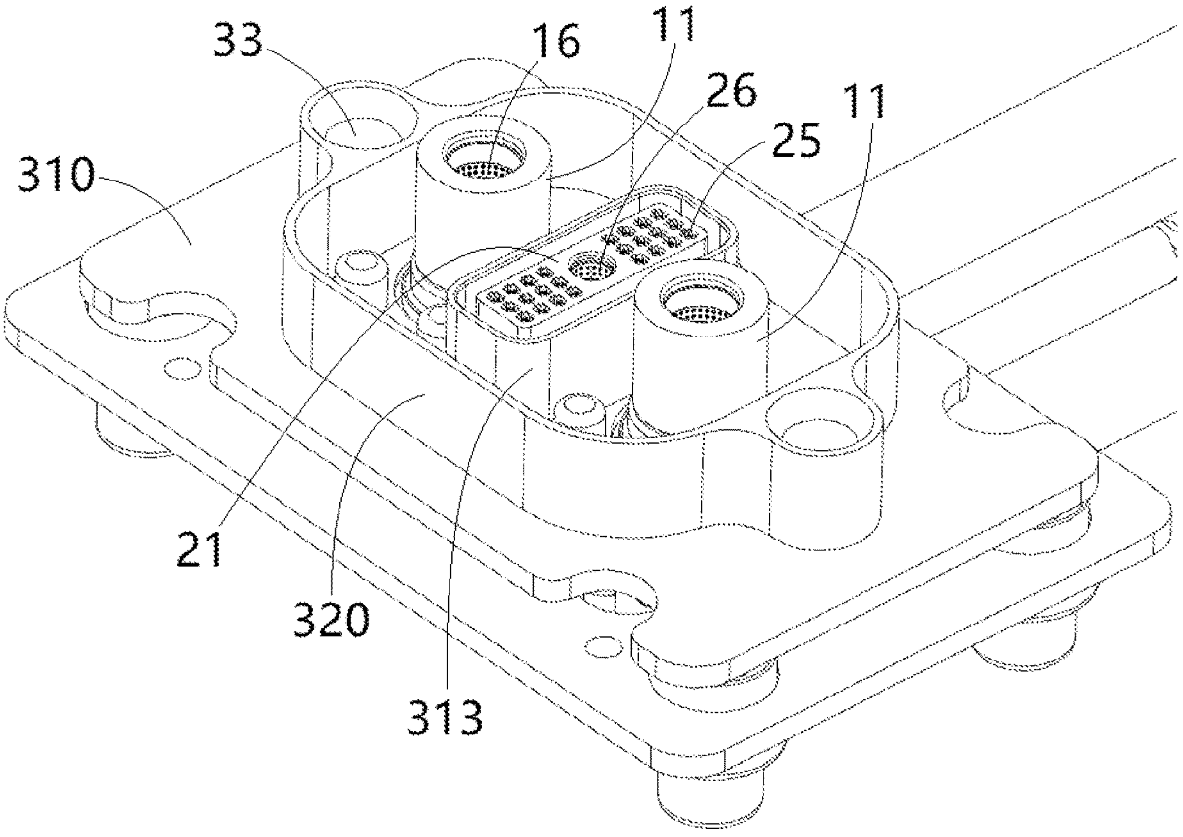
FIG. 7 shows an illustrative perspective view of a connector assembly according to an exemplary embodiment of the present invention when viewed from the bottom.
Figure 8:
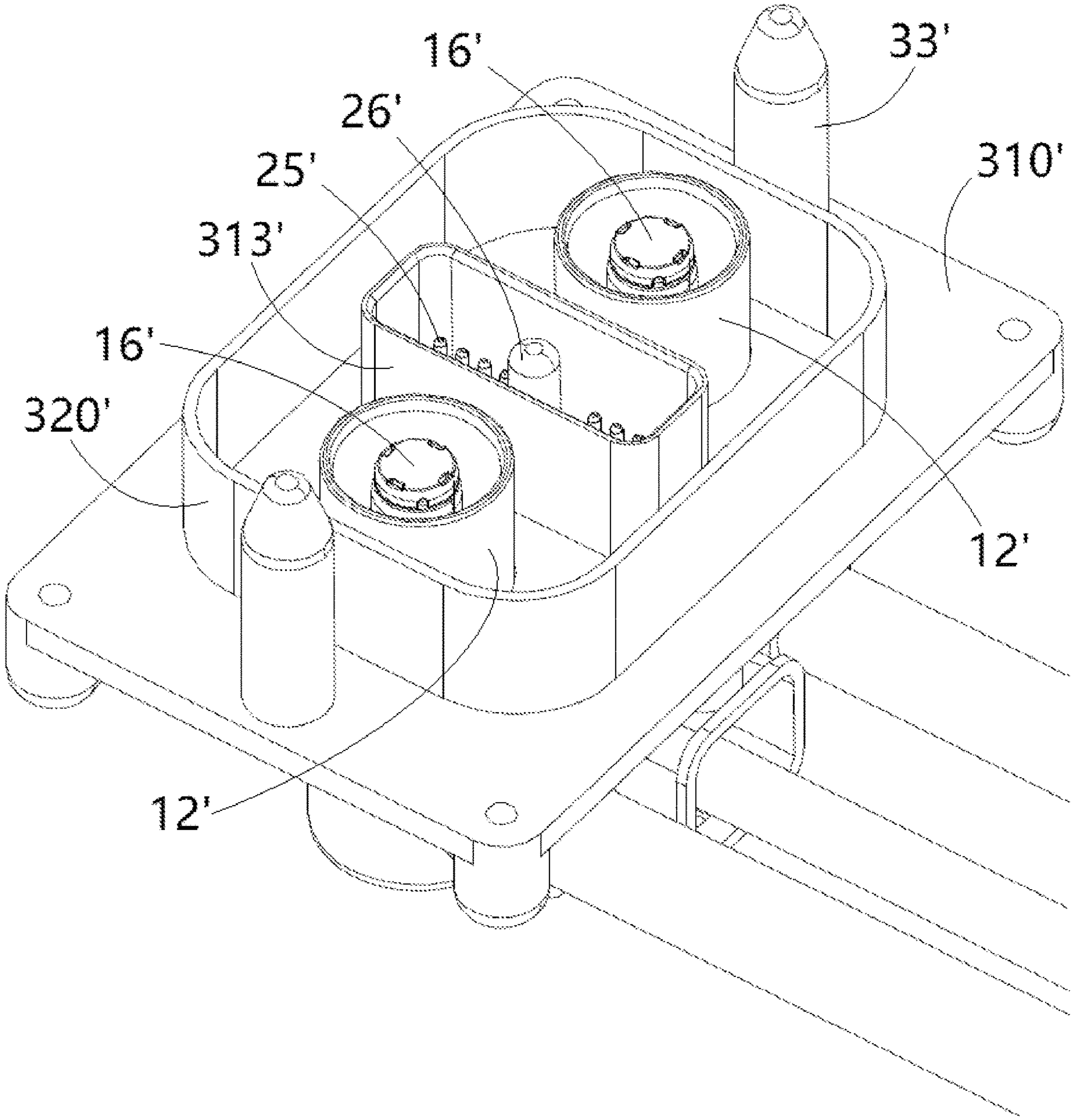
FIG. 8 shows an illustrative perspective view of a mating connector assembly according to an exemplary embodiment of the present invention when viewed from the top surface.

As shown in FIGS. 2, 4, and 7, in the illustrated embodiment, the installation seat 3 includes: an installation plate 310, a convex portion 312, and a housing portion 313. The convex portion 312 is formed on the top surface of the installation plate 310. The housing portion 313 is protruded and formed on the bottom surface of the installation plate 310. The second insulator 21 has a flange part 21*a* fixed on the convex portion 312, and the second installation hole 32 penetrates through the convex portion 312 and the installation plate 310 and is communicated with the inner cavity of the housing portion 313. The other part of the second insulator 21 passes through the second installation hole 32 and extends into the inner cavity of the housing portion 313, which is used to mate with a mating housing portion 313' of a mating installation seat 3'. In this way, the mating portions of the signal terminal 25 and the mating signal terminal 25', as well as the mating portions of the grounding terminal 26 and the mating grounding terminal 26', can be accommodated in a receiving cavity limited by the housing portion 313 and the mating housing portion 313', which can prevent the signal terminal 25 from being subjected to external electromagnetic interference.

Figure 5:
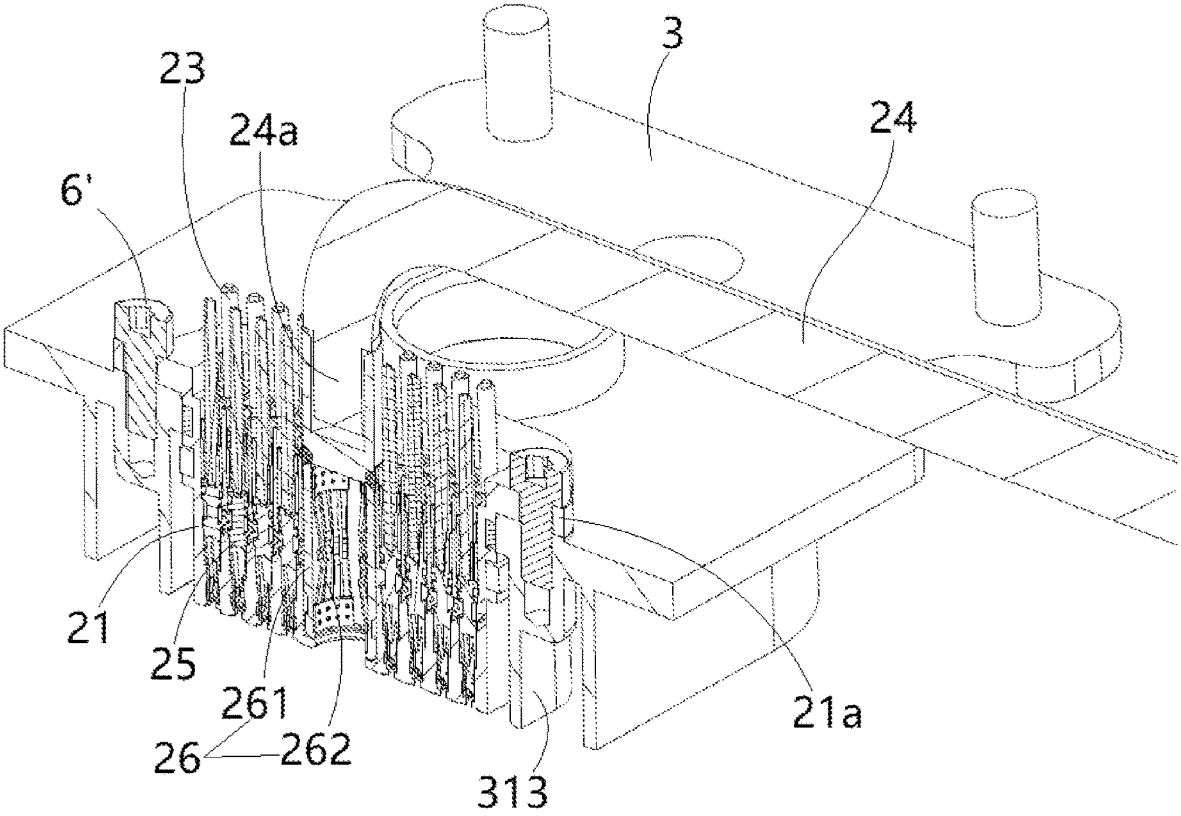
FIG. 5 shows an axial cross-sectional view of an installation seat and a second connector of a connector assembly according to an exemplary embodiment of the present invention.

As shown in FIG. 5, the illustrated embodiments, a second connection hole is formed on the flange part 21*a* of the second insulator 21, a second threaded hole 36 is formed on the installation seat 3, and the second connector 2 also includes a second screw 6'. The second screw 6' passes through the second connection hole and is threaded into the second threaded hole 36 to secure the second insulator 21 to the installation seat 3.

Figure 6:
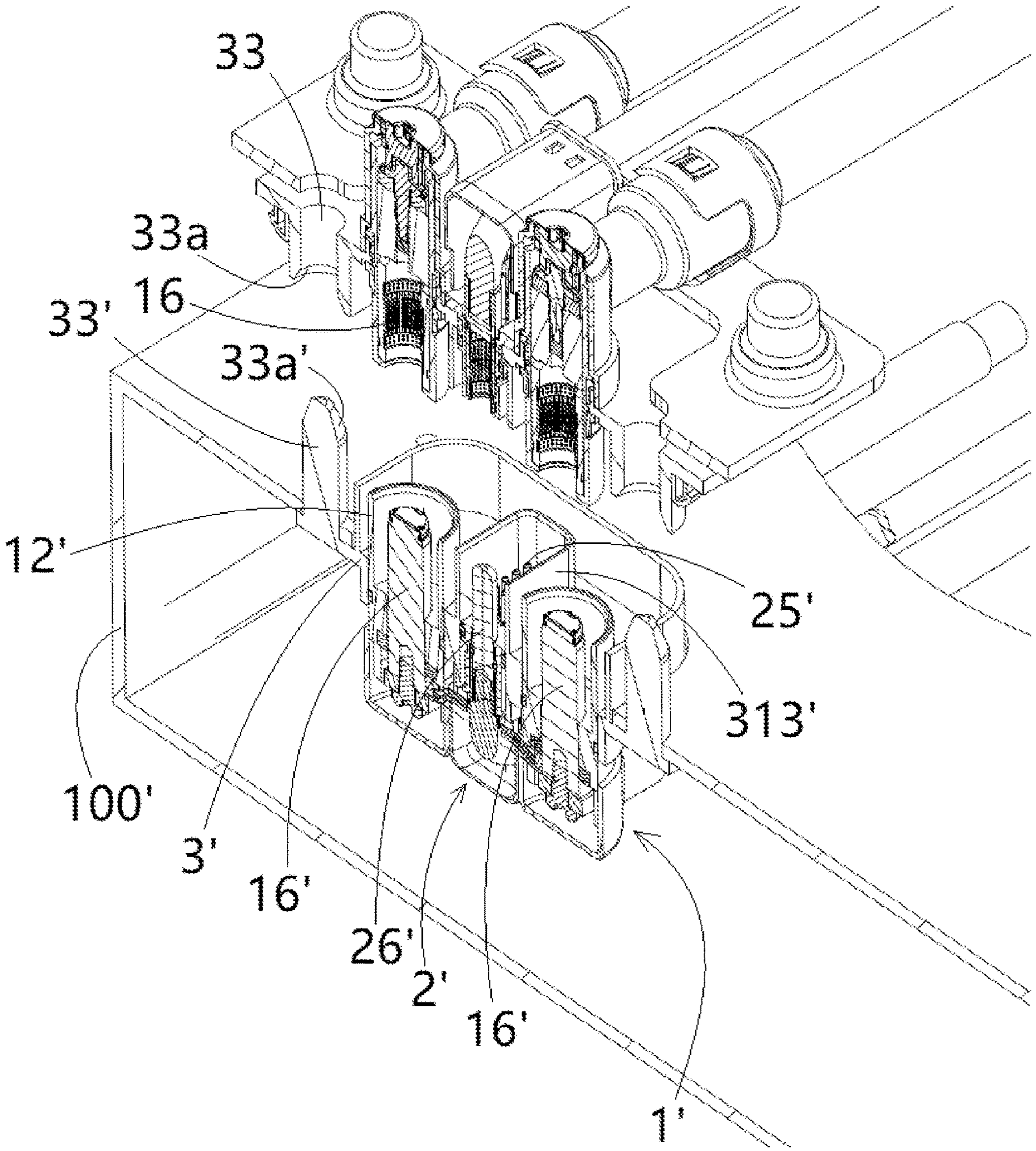
FIG. 6 shows an illustrative view of a connector assembly and a mating connector assembly according to an exemplary embodiment of the present invention.

As shown in FIG. 5, in the illustrated embodiments, the grounding terminal 26 includes a second terminal body 261 and a second elastic contact member 262. One end of the second terminal body 261 is crimped onto one end 24*a* of the grounding cable 24, and the other end is formed with a second cavity. The second elastic contact member 262 is installed in the second cavity of the second terminal body 261 for electrical contact with an inserted mating grounding terminal 26'. In the illustrated embodiment, the second elastic contact member 262 includes multiple elastic arms distributed at circumferential intervals. The grounding terminal 26', as shown in FIG. 6, is cylindrical and is adapted to be inserted between multiple elastic arms of the second elastic contact 262. In the illustrated embodiment, one end of the signal terminal 25 is crimped onto the signal cable 23, and the other end is suitable for mating with the mating signal terminal 25'.

Figure 12:
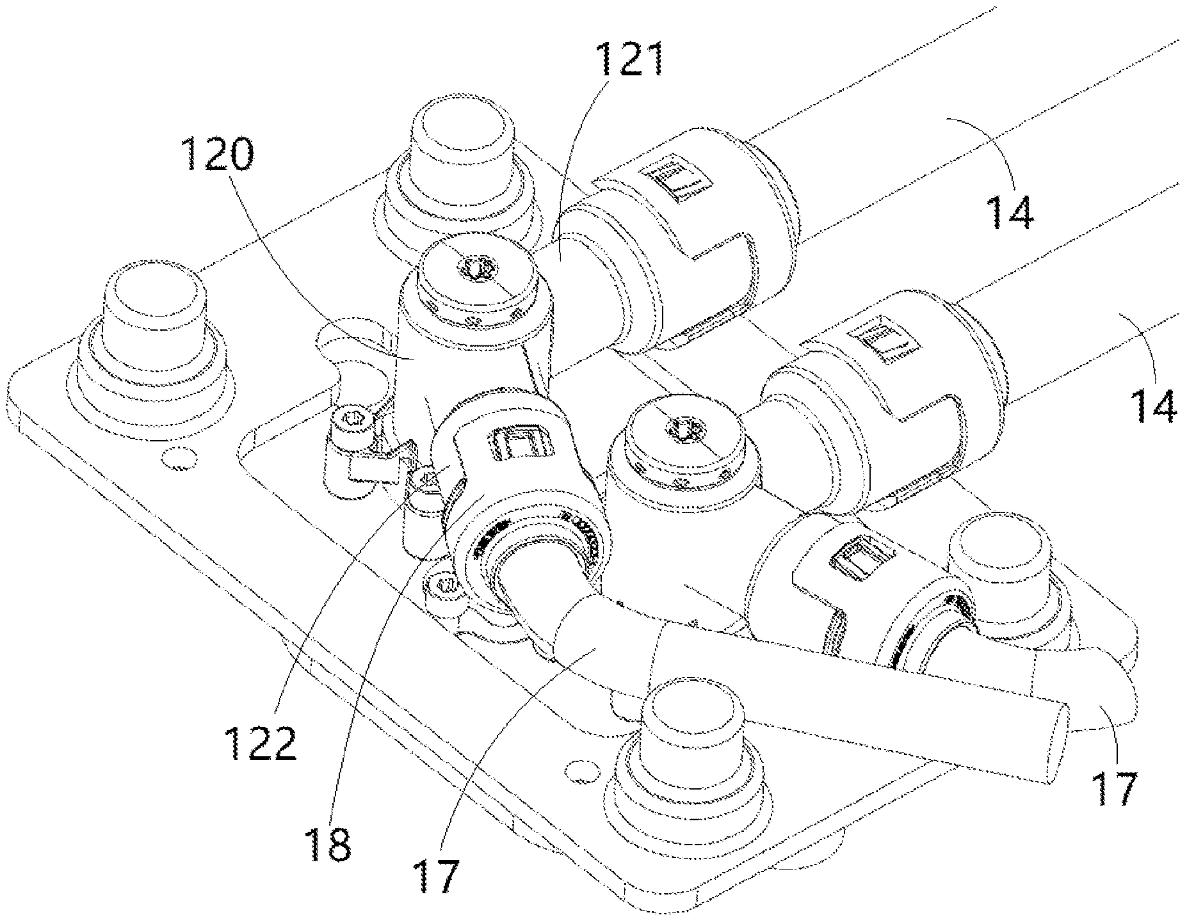
FIG. 12 shows an illustrative perspective view of a connector assembly according to another exemplary embodiment of the present invention.

FIG. 12 shows an illustrative perspective view of a connector assembly according to another exemplary embodiment of the present invention. The main difference between the connector assembly shown in FIG. 12 and the connector assembly shown in FIG. 1 is that the first connector 1 adds a power cable. As shown in FIG. 12, in the illustrated embodiment, the first shielding shell 12 also has a second cable port, and the first connector 1 also includes a second power cable 17. One end of the second power cable 17 extends into the first shielding shell 12 through the second cable port and is electrically connected to the power terminal 16.

As shown in FIG. 12, in the illustrated embodiment, the first shielding shell 12 includes a main body part 120, a first extension part 121, and a second extension part 122. The first extension part 121 is connected to the main body part 120 and extends in the first direction. The second extension part 122 is connected to the main body part 120 and extends in a second direction different from the first direction. The first installation port is formed on the main body part 120, and the first cable port and the second cable port are respectively formed on the first extension part 121 and the second extension part 122. In the illustrated embodiment, the main body part 120 extends vertically, with the first and second installation ports formed at both ends of the main body part 120, respectively. The first extension part 121 extends in a first horizontal direction, and the second extension part 122 extends in a second horizontal direction different from the first horizontal direction.

The present invention is not limited to the illustrated embodiments, for example, the first shielding shell 12 may include three or more cable ports and three or more power cables. In this way, the application range of the first connector 1 can be expanded.

As shown in FIG. 12, in the illustrated embodiment, the first connector 1 further includes a second end cap 18, which is sleeved on the second power cable 17 and locked onto the outer wall of the second cable port of the first shielding shell 12.

In addition to the aforementioned differences, the other technical features of the connector assembly shown in FIG. 12 are basically the same as those shown in FIG. 1, which can be referred to as the connector assembly shown in FIG. 1.

As shown in FIGS. 1 to 11, in the illustrated embodiment, the connector assembly further includes a fixed bracket 4 and an elastic assembly 5 and 6. The elastic assembly 5 and 6 is arranged between the installation seat 3 and the fixed bracket 4. The installation seat 3 is floatable mounted on the fixed bracket 4 through the elastic assembly 5 and 6, allowing it to float relative to the fixed bracket 4 in the mating direction (vertical direction in the figure) of the connector assembly and the matching connector assembly and a direction perpendicular to the mating direction.

Figure 9:
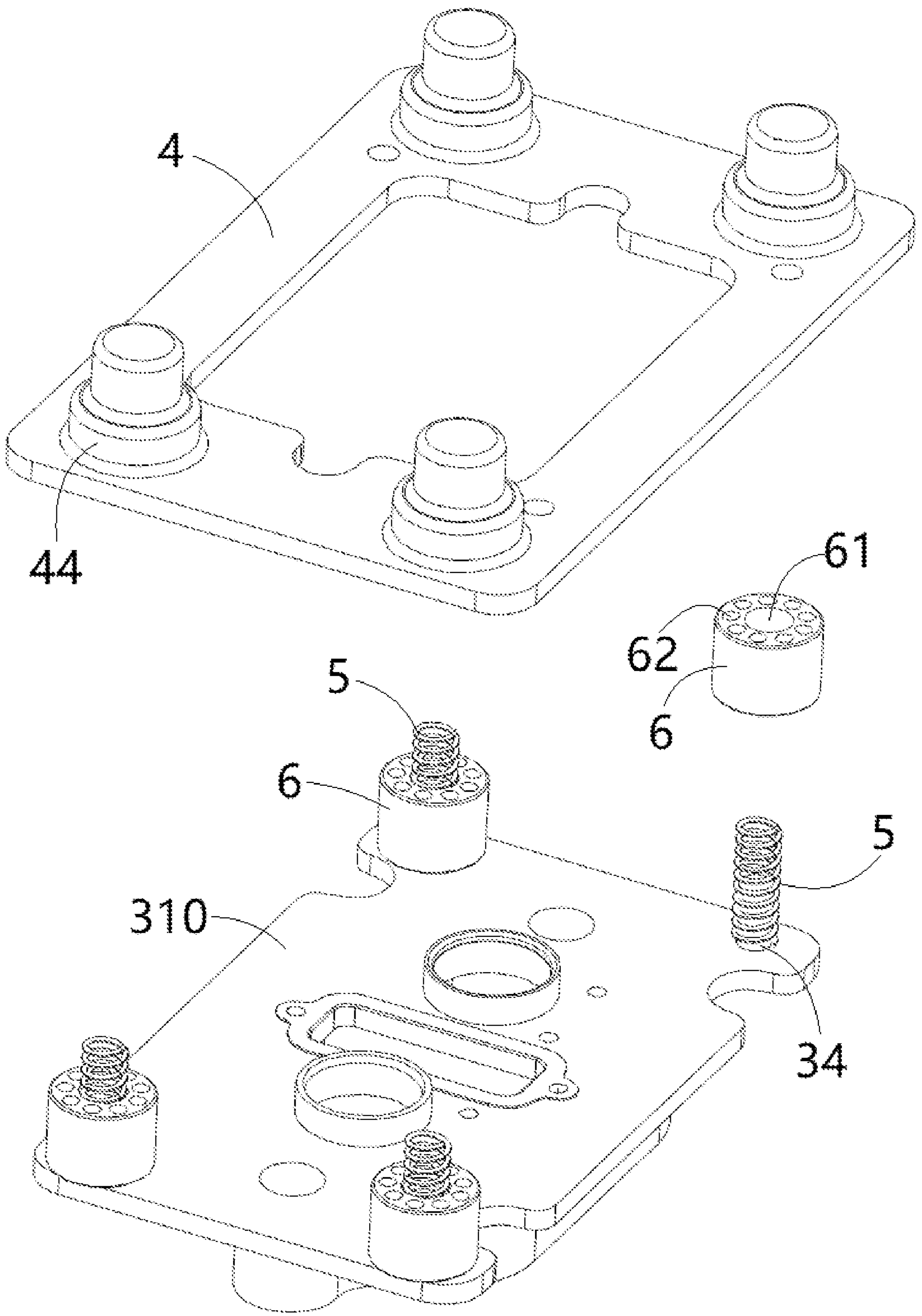
FIG. 9 shows an illustrative view of the disassembly of the installation seat, fixed bracket, and elastic assembly of the connector assembly according to an exemplary embodiment of the present invention.
Figure 10:
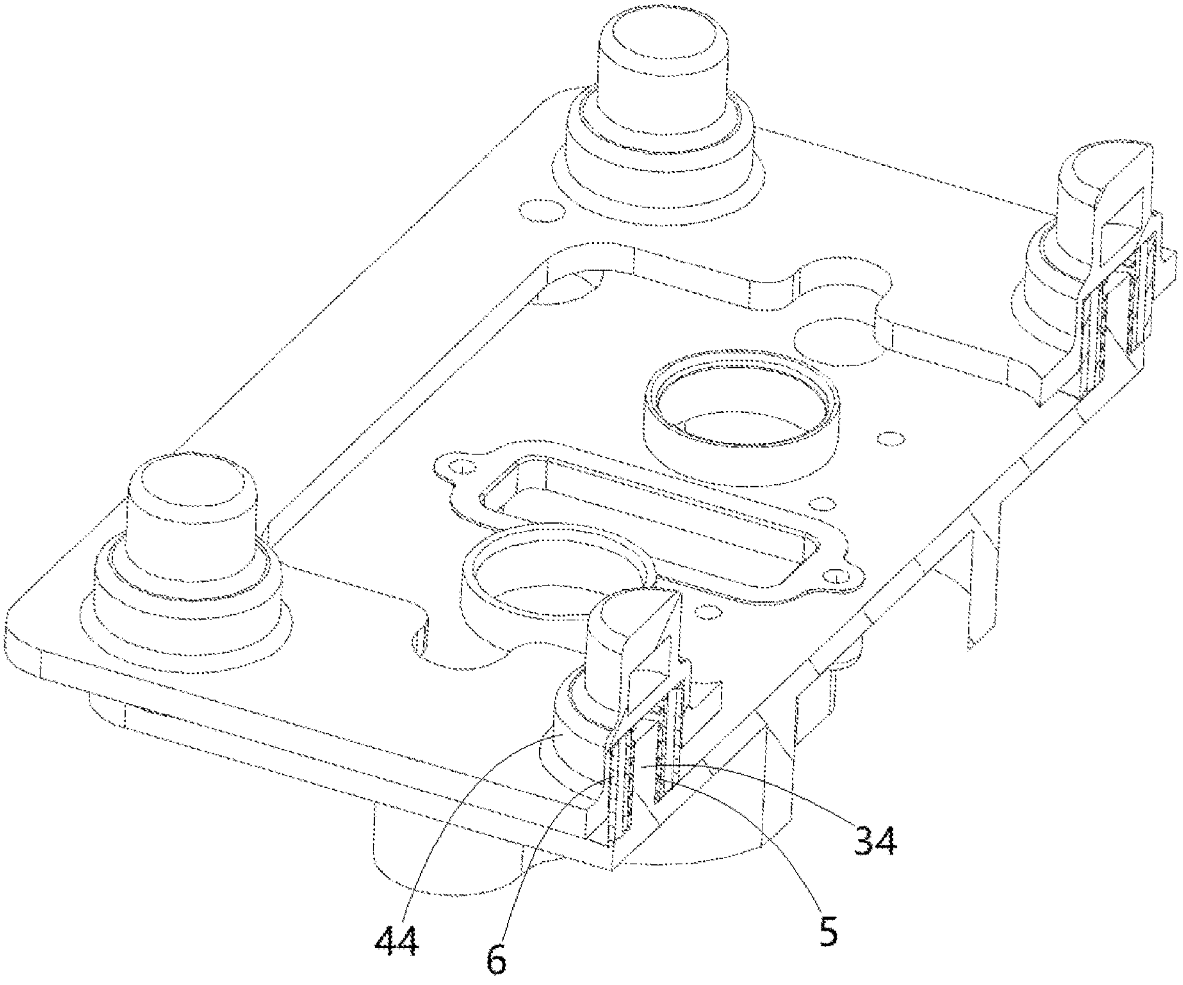
FIG. 10 shows an illustrative view of the assembly of the installation seat, fixed bracket, and elastic assembly of the connector assembly according to an exemplary embodiment of the present invention.
Figure 11:
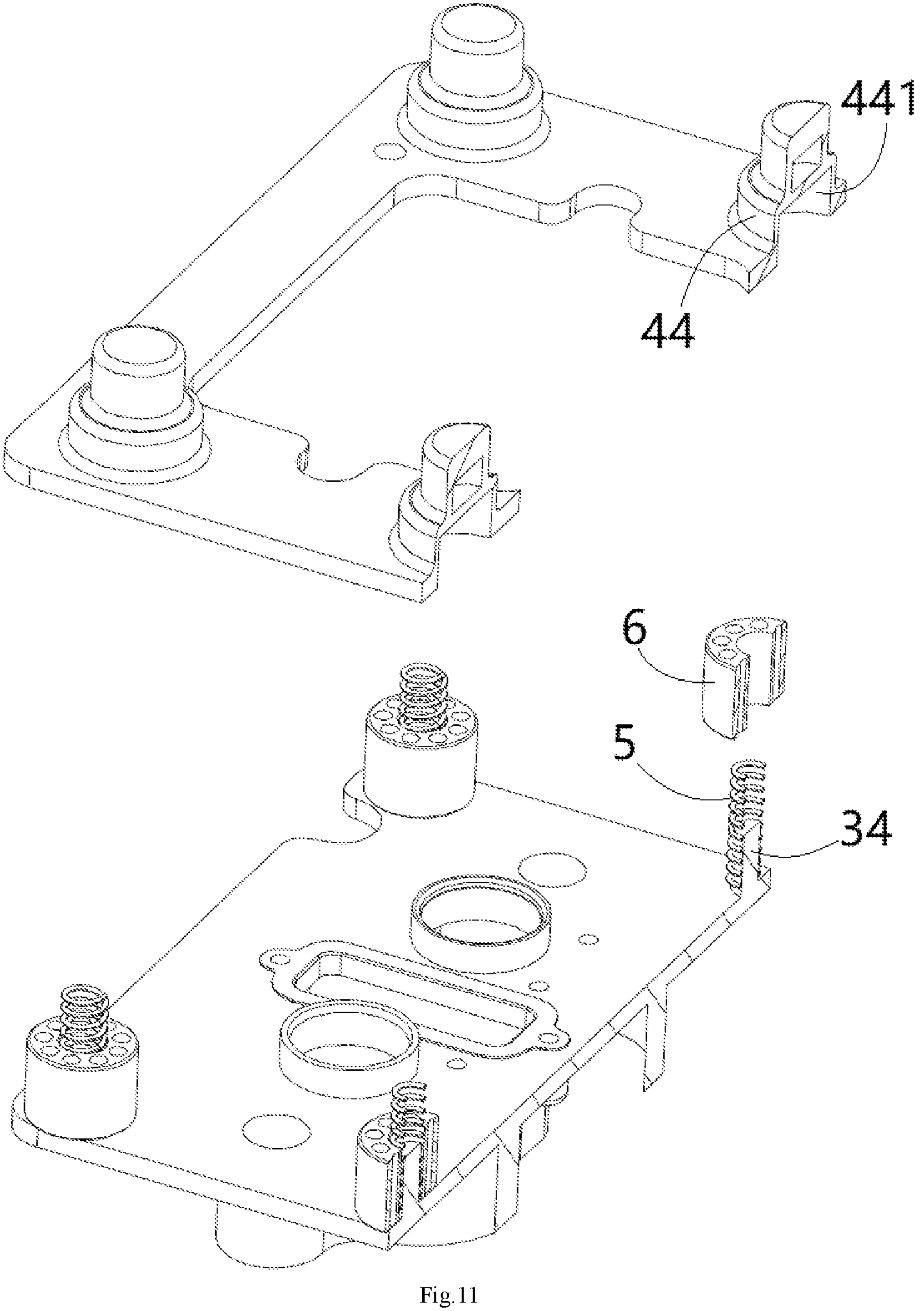
FIG. 11 shows a cross-sectional view of the installation seat, fixed bracket, and elastic assembly of a connector assembly according to an exemplary embodiment of the present invention.

As shown in FIGS. 2 and 9, in the illustrated embodiment, the installation seat 3 includes an installation plate 310 and a positioning post 34 formed on the top surface of the installation plate 310. The fixed bracket 4 includes a positioning cap 44. The elastic assembly 5 and 6 is installed on the positioning post 34 and accommodated in the positioning cap 44. The elastic assembly 5 and 6 is suitable for elastic deformation along the axial and radial directions of the positioning post 34 to allow the installation seat 3 to float in the mating direction and the direction perpendicular to the mating direction.

As shown in FIG. 9, in the illustrated embodiments, the elastic assembly 5 and 6 includes a spiral spring 5 and a cylindrical elastic body 6. The spiral spring 5 is installed on the positioning post 34 and is adapted to be axially compressed between the installation plate 310 and the top wall of the positioning cap 44 to allow the installation seat 3 to float upwards in the mating direction. The cylindrical elastic body 6 is mounted on the positioning post 34 and is adapted to be radially compressed between the circumferential walls of the positioning post 34 and the positioning cap 44 to allow the installation seat 3 to float in the direction perpendicular to the mating direction.

As shown in FIG. 9, in the illustrated embodiments, a central through hole 61 and multiple surrounding through holes 62 spaced around the central through hole 61 are formed in the cylindrical elastic body 6, and the spiral spring 5 and positioning post 34 pass through the central through hole 61. Multiple surrounding through holes 62 can improve the radial elasticity of cylindrical elastic body 6.

In an exemplary embodiment of the present invention, an electrical connection assembly is also disclosed. The electrical connection assembly includes the aforementioned connector assembly and a mating connector assembly. The connector assembly is mated with the mating connector assembly. The mating connector assembly, as shown in FIG. 6, includes: a mating installation seat 3', which is mated with the installation seat 3; a first mating connector 1' which is installed on the mating installation seat 3' and mated with the first connector 1; and a second mating connector 2' which is installed on the mating installation seat 3' and mated with the second connector 2. In the illustrated embodiment, the installation seat 3 is floatable installed on the fixed bracket 4 which is used to be fixed to the body of the electric vehicle. The mating installation seat 3' is fixed to the battery pack cover plate 100'.

As shown in FIG. 6, a guide pillar 33' is formed on one of the installation seat 3 and the mating installation seat 3', and the guide pillar 33' has a conical guide end **33*a*'. A guide hole 33 is formed in the other of the installation seat 3 and the matching installation seat 3', and the guide hole 33 has a conical guide port 33*a*. The guide pillar 33' is mated with the guide hole 33 to guide the installation seat 3 to mate with the mating installation seat 3'. In the illustrated embodiment, due to the installation seat 3 being able to float in the mating direction and the direction perpendicular to the mating direction, the mating operation between the connector assembly and the mating connector assembly can be conveniently achieved through the guidance of the guide pillar 33' and the guide hole 33**.

In the illustrated embodiments, the installation seat 3 includes an installation plate 310 and a circumferential wall 320 formed on the bottom surface of the installation plate 310, the mating installation seat 3' includes a fixed plate 310' and a mating circumferential wall 320' formed on the fixed plate 310', and the circumferential wall 320 is mated with the mating circumferential wall 320' to define a receiving cavity. The mating portions of the first connector 1 and the first mating connector 1', as well as the mating portions of the second connector 2 and the second mating connector 2', are accommodated in the receiving cavity defined by the circumferential wall 320 and the mating circumferential wall 320'. This can prevent external water vapor from entering the first connector 1, first mating connector 1', second connector 2, and second mating connector 2', improving the waterproof and sealing performance.

In the aforementioned exemplary embodiments of the present invention, all signal terminals and grounding terminals are integrated into the same low-voltage connector, thus simplifying the structure of the connector assembly, reducing the volume and weight of the connector assembly, and making it very convenient to use.

In addition, in the present invention, the low-voltage connector and the high-voltage connector used for transmitting power are both detachably installed on the installation seat in a modular manner, thus enabling quick installation and replacement, and being very convenient to use.

In addition, in the present invention, since the high-voltage and low-voltage connectors can be installed and disassembled separately, in the event of a problem with a particular connector, only the faulty connector can be replaced without the need to replace the entire connector assembly, thereby reducing costs.

In addition, in some exemplary embodiments according to the present invention, the high-voltage connector used for transmitting power includes multiple power cables. Therefore, multiple electrical devices (such as electric motors) can be electrically connected simultaneously through the same high-voltage connector, expanding the application range of the high-voltage connector. In addition, the outgoing direction of multiple power cables can be changed as needed, making on-site wiring more flexible.

In addition, in some exemplary embodiments according to the present invention, the installation seat for high-voltage and low-voltage connectors can float in the mating direction and the direction perpendicular to the mating direction, thus making the mating operation between the connector assembly and the mating connector assembly easier and more convenient.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly, comprising:
- an installation seat having a pair of first installation holes and a second installation hole;
- a pair of first connectors respectively detachably inserted into the first installation holes, each of the first connectors has a power terminal, each of the first connectors includes a first shielding shell and a first insulator, the first shielding shell having a first installation port and a first cable port, a portion of the first insulator is inserted into the first shielding shell through the first installation port and another portion of the first insulator extends out of the first shielding shell, the power terminal is provided in the first insulator; and
- a second connector detachably inserted into the second installation hole, the second connector has a signal terminal and a grounding terminal.

2. The connector assembly according to claim 1, wherein the first connector includes:
- a first power cable having an end extending into the first shielding shell through the first cable port, the first power cable is electrically connected to the power terminal.

3. The connector assembly according to claim 2, wherein the first shielding shell has a second cable port and the first connector includes a second power cable, an end of the second power cable extends into the first shielding shell through the second cable port and is electrically connected to the power terminal.

4. The connector assembly according to claim 3, wherein the first shielding shell includes:
- a main body part;
- a first extension part connected to the main body part and extending in a first direction; and
- a second extension part connected to the main body part and extending in a second direction different from the first direction, the first installation port is formed on the main body part, the first cable port and the second cable port are respectively formed on the first extension part and the second extension part.

5. The connector assembly according to claim 2, wherein the installation seat includes an installation plate and a positioning part formed on a top surface of the installation plate, the positioning part is assembled into the first installation port of the first shielding shell, one of the first installation holes runs through the positioning part and the installation plate, another part of the first insulator passes through the first installation hole and protrudes from a bottom surface of the installation plate to be inserted into a first mating shielding shell of a first mating connector.

6. The connector assembly according to claim 5, wherein the power terminal includes a first terminal body, an end of the terminal body is electrically connected to the first power cable, another end of the terminal body has a first cavity, a first elastic contact member is installed in the first cavity and electrically contacts an inserted first mating power terminal of the first mating connector.

7. The connector assembly according to claim 6, wherein the first power cable has an exposed flat conductor end, a connecting hole is formed on the exposed flat conductor end, the first shielding shell has a second installation port opposite the first installation port, one of the first connectors has a fastening assembly installed in the second installation port, the fastening assembly includes a connecting bolt passing through the connecting hole in the exposed flat conductor end and threaded to the first terminal body, a shielding end cap sleeved on the second installation port of the first shielding shell to cover the second installation port, and an insulation nut engaged between the connecting bolt and the shielding end cap to electrically isolate the connecting bolt from the shielding end cap, an engagement part suitable for engaging with an operating tool is formed on the shielding end cap, enabling the connecting bolt to be rotated by the operating tool.

8. The connector assembly according to claim 3, wherein the first connector includes:
- a first end cap sheathed on the first power cable and locked to an outer wall of the first cable port of the first shielding shell; and
- a second end cap sheathed on the second power cable and locked to an outer wall of the second cable port of the first shielding shell.

9. The connector assembly according to claim 2, wherein a connecting ear is formed on the first shielding shell, a first connection hole is formed on the connecting ear, and a first threaded hole is formed on the installation seat, the first connector includes a first screw that passes through the first connection hole and is threaded into the first threaded hole to secure the first shielding shell to the installation seat.

10. The connector assembly according to claim 1, wherein the second connector includes:

a second shielding shell having an installation port and a cable port;

a second insulator having a portion inserted into the second shielding shell through the installation port, the signal terminal and the grounding terminal are provided in the second insulator;

a signal cable having an end extending into the second shielding shell through the cable port and electrically connected to the signal terminal; and a grounding cable having an end extending into the second shielding shell through the cable port and electrically connected to the grounding terminal.

11. The connector assembly according to claim 10, wherein the installation seat includes:

an installation plate;

a convex portion formed on a top surface of the installation plate; and a housing portion formed on a bottom surface of the installation plate, the second insulator has a flange part fixed on the convex portion, the second installation hole runs through the convex portion and the installation plate and is communicated with an inner cavity of the housing portion, another part of the second insulator passes through the second installation hole and extends into the inner cavity of the housing portion, the housing portion is mateable with a mating housing portion of a mating installation seat.

12. The connector assembly according to claim 11, wherein a second connecting hole is formed on the flange part, a second threaded hole is formed on the installation seat, the second connector also includes a second screw which passes through the second connecting hole and is threaded into the second threaded hole to fix the second insulator to the installation seat.

13. The connector assembly according to claim 10, wherein the grounding terminal includes:

a second terminal body having an end crimped onto the grounding cable, another end of the second terminal body has a second cavity; and a second elastic contact member installed in the second cavity and electrically contacting an inserted mating grounding terminal, an end of the signal terminal is crimped onto the signal cable, and another end of the signal terminal is mateable with a mating signal terminal.

14. The connector assembly according to claim 1, further comprising:

a fixed bracket; and an elastic assembly arranged between the installation seat and the fixed bracket, the installation seat is floatably installed on the fixed bracket through the elastic assembly, the installation seat can float relative to the fixed bracket in a mating direction of the connector assembly and a mating connector assembly and in a direction perpendicular to the mating direction.

15. The connector assembly according to claim 14, wherein the installation seat includes an installation plate and a positioning post formed on a top surface of the installation plate, the fixed bracket includes a positioning cap, the elastic assembly is sleeved on the positioning post and accommodated in the positioning cap, the elastic assembly is suitable for elastic deformation in an axial direction and a radial direction of the positioning post to allow the installation seat to float in the mating direction and the direction perpendicular to the mating direction.

16. The connector assembly according to claim 15, wherein the elastic assembly includes:

a spiral spring sheathed on the positioning post and axially compressed between the installation plate and a top wall of the positioning cap to allow the installation seat to float upwards in the mating direction; and a cylindrical elastic body sheathed on the positioning post and radially compressed between a plurality of circumferential walls of the positioning post and the positioning cap to allow the installation seat to float in the direction perpendicular to the mating direction.

17. The connector assembly according to claim 16, wherein a central through hole and a plurality of surrounding through holes spaced around the central through hole are formed in the cylindrical elastic body, the spiral spring and the positioning post pass through the central through hole.

18. An electrical connection assembly, comprising:

a connector assembly includes an installation seat having a pair of first installation holes and a second installation hole, a pair of first connectors respectively detachably inserted into the first installation holes, each of the first connectors has a power terminal, and a second connector detachably inserted into the second installation hole, the second connector has a signal terminal and a grounding terminal; and a mating connector assembly mated with the connector assembly, the mating connector assembly includes a mating installation seat mated with the installation seat, a first mating connector installed on the mating installation seat and mated with the first connector, and a second mating connector on the mating installation seat and mated with the second connector, a guide pillar is formed on one of the installation seat and the mating installation seat, the guide pillar has a conical guide end, a guide hole is formed in the other of the installation seat and the mating installation seat, the guide hole has a conical guide port, the guide pillar is mated with the guide hole to guide the installation seat to mate with the mating installation seat.

19. A connector assembly, comprising:

an installation seat including:

an installation plate;

a convex portion formed on a top surface of the installation plate;

a housing portion formed on a bottom surface of the installation plate;

a pair of first installation holes; and a second installation hole that runs through the convex portion, the installation plate and is communicated with an inner cavity of the housing portion;

a pair of first connectors respectively detachably inserted into the first installation holes, each of the first connectors has a power terminal; and a second connector detachably inserted into the second installation hole, the second connector has a signal terminal and a grounding terminal, the second connector includes:

a second shielding shell having an installation port and a cable port;

a second insulator having a portion inserted into the second shielding shell through the installation port, the signal terminal and the grounding terminal are provided in the second insulator, the second insulator has a flange part fixed on the convex portion, another part of the second insulator passes through the second installation hole and extends into the inner cavity of the housing portion, the housing portion is mateable with a mating housing portion of a mating installation seat;

a signal cable having an end extending into the second shielding shell through the cable port and electrically connected to the signal terminal; and a grounding cable having an end extending into the second shielding shell through the cable port and electrically connected to the grounding terminal.

20. A connector assembly, comprising:

an installation seat having a pair of first installation holes and a second installation hole;

a pair of first connectors respectively detachably inserted into the first installation holes, each of the first connectors has a power terminal;

a second connector detachably inserted into the second installation hole, the second connector has a signal terminal and a grounding terminal;

a fixed bracket; and an elastic assembly arranged between the installation seat and the fixed bracket, the installation seat is floatably installed on the fixed bracket through the elastic assembly, the installation seat can float relative to the fixed bracket in a mating direction of the connector assembly and a mating connector assembly and in a direction perpendicular to the mating direction.

21. An electrical connection assembly, comprising:

a connector assembly includes an installation seat having a pair of first installation holes and a second installation hole, a pair of first connectors respectively detachably inserted into the first installation holes, each of the first connectors has a power terminal, and a second connector detachably inserted into the second installation hole, the second connector has a signal terminal and a grounding terminal; and a mating connector assembly mated with the connector assembly, the mating connector assembly includes a mating installation seat mated with the installation seat, a first mating connector installed on the mating installation seat and mated with the first connector, and a second mating connector on the mating installation seat and mated with the second connector, the installation seat includes an installation plate and a circumferential wall formed on a bottom surface of the installation plate, the mating installation seat includes a fixed plate and a mating circumferential wall formed on the fixed plate, the circumferential wall is mated with the mating circumferential wall to define a receiving cavity, a plurality of mating portions of the first connector and the first mating connector as well as a plurality of mating portions of the second connector and the second mating connector are accommodated in the receiving cavity defined by the circumferential wall and the mating circumferential wall.

* * * * *